(12) United States Patent
McNeil et al.

(10) Patent No.: US 11,149,788 B2
(45) Date of Patent: Oct. 19, 2021

(54) HYBRID BEARING ASSEMBLY WITH ROLLING ELEMENTS AND PLAIN BEARING

(71) Applicant: ROLLER BEARING COMPANY OF AMERICA, INC., Oxford, CT (US)

(72) Inventors: Scott McNeil, Gilford, NH (US); Scott Crossman, Harwinton, CT (US); David Coombe, Chewton Keynsham (GB); Jay Phoenix, Bristol, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 524 days.

(21) Appl. No.: 14/438,785

(22) PCT Filed: Apr. 29, 2013

(86) PCT No.: PCT/US2013/038626
§ 371 (c)(1),
(2) Date: Apr. 27, 2015

(87) PCT Pub. No.: WO2014/021958
PCT Pub. Date: Feb. 6, 2014

(65) Prior Publication Data
US 2015/0292561 A1    Oct. 15, 2015

Related U.S. Application Data

(60) Provisional application No. 61/640,302, filed on Apr. 30, 2012.

(51) Int. Cl.
*F16C 21/00* (2006.01)
*F16C 23/08* (2006.01)
(Continued)

(52) U.S. Cl.
CPC .............. *F16C 21/00* (2013.01); *B64C 9/02* (2013.01); *B64C 9/16* (2013.01); *F16C 23/086* (2013.01);
(Continued)

(58) Field of Classification Search
CPC .......... F16C 21/00; F16C 23/02; F16C 23/06; F16C 23/086; F16C 33/201; F16C 33/6696; F16C 2326/43
See application file for complete search history.

(56) References Cited

U.S. PATENT DOCUMENTS

| 1,457,584 A | 5/1921 | McCuen |
| 2,067,464 A | 11/1933 | Smith |
(Continued)

FOREIGN PATENT DOCUMENTS

| DE | 19750113 A1 | 5/1998 |
| DE | 10110067 A1 | 9/2002 |
(Continued)

OTHER PUBLICATIONS

Translation of JP9-236120 obtained May 23, 2017.*
(Continued)

*Primary Examiner* — James Pilkington
(74) *Attorney, Agent, or Firm* — Murtha Cullina LLP

(57) ABSTRACT

A bearing assembly includes an outer race having an inner surface defining a concave contour and an inner race positioned in the outer race. The inner race has an inner surface defining a bore therethrough and an outer surface defining at least one groove circumscribing the outer surface. A plurality of rolling elements is rollably located in the groove and is in rolling contact with the inner surface of the outer race. A lubricious liner has an inner liner-surface and an exterior liner-surface, the exterior liner-surface being disposed on the inner surface defining the bore. The lubricious liner has a
(Continued)

modulus of compression of a magnitude sufficient to allow misalignment of the inner liner-surface relative to the exterior liner-surface in response to a force applied thereto.

8 Claims, 10 Drawing Sheets

(51) Int. Cl.
- *B64C 9/02* (2006.01)
- *F16C 23/02* (2006.01)
- *F16C 19/06* (2006.01)
- *B64C 9/16* (2006.01)
- *F16C 19/18* (2006.01)
- *F16C 19/26* (2006.01)

(52) U.S. Cl.
CPC .............. *F16C 19/06* (2013.01); *F16C 19/183* (2013.01); *F16C 19/26* (2013.01); *F16C 23/02* (2013.01); *F16C 2208/32* (2013.01); *F16C 2326/43* (2013.01)

(56) References Cited

U.S. PATENT DOCUMENTS

| | | | |
|---|---|---|---|
| 2,620,147 A | 12/1952 | Butler et al. | |
| 2,766,079 A | 10/1956 | Browne | |
| 2,807,509 A | 9/1957 | Anderson | |
| 2,813,395 A | 11/1957 | Meyer | |
| 2,822,225 A | 2/1958 | Teufel | |
| 2,908,532 A | 10/1959 | Runton et al. | |
| 2,919,942 A * | 1/1960 | Bechtel | F16C 11/045 384/428 |
| 3,266,123 A | 8/1966 | McCloskey | |
| 3,458,223 A | 7/1969 | White | |
| 3,550,232 A | 12/1970 | Burnett | |
| 3,581,267 A | 5/1971 | Schreffler | |
| 3,582,166 A | 6/1971 | Reising | |
| 3,656,821 A | 4/1972 | McCloskey et al. | |
| 3,769,672 A | 11/1973 | Eklund | |
| 3,779,619 A | 12/1973 | Van Dorn et al. | |
| 3,913,990 A | 10/1975 | Eklund | |
| 3,932,008 A | 1/1976 | McCloskey et al. | |
| 3,954,225 A | 5/1976 | Camboulives et al. | |
| 4,048,370 A | 9/1977 | Orkin et al. | |
| 4,053,665 A | 10/1977 | Orkin et al. | |
| 4,111,499 A | 9/1978 | McCloskey | |
| 4,118,009 A | 10/1978 | Chmura | |
| 4,134,842 A | 1/1979 | Orkin et al. | |
| 4,171,787 A | 10/1979 | Zapel | |
| 4,189,249 A | 2/1980 | Gaines et al. | |
| 4,204,719 A | 5/1980 | Murphy | |
| 4,232,436 A | 11/1980 | Chmura | |
| 4,243,192 A | 1/1981 | Johnson | |
| 4,248,486 A | 2/1981 | Bradley, Jr. | |
| 4,253,711 A | 3/1981 | Lynn et al. | |
| 4,399,970 A | 8/1983 | Evans | |
| 4,437,631 A | 3/1984 | Martens et al. | |
| 4,471,928 A | 9/1984 | Cole | |
| 4,509,871 A | 4/1985 | Herzog et al. | |
| 4,571,936 A | 2/1986 | Nash et al. | |
| 4,650,140 A | 3/1987 | Cole | |
| 4,717,268 A | 1/1988 | Orkin | |
| 4,753,402 A | 6/1988 | Cole | |
| 4,755,104 A | 7/1988 | Castro et al. | |
| 4,763,862 A | 8/1988 | Steinhauer et al. | |
| 4,838,503 A | 6/1989 | Williams | |
| 4,848,934 A | 7/1989 | Blakely et al. | |
| 4,887,919 A | 12/1989 | Hamblin | |
| 4,973,172 A | 11/1990 | Nisley et al. | |
| 5,009,524 A | 4/1991 | Dittenhoefer | |
| 5,017,024 A * | 5/1991 | Clark | F16C 33/7886 277/402 |
| 5,028,151 A | 6/1991 | Nisley | |
| 5,073,038 A | 12/1991 | O'Connell | |
| 5,119,446 A * | 6/1992 | Grafstrom | F16C 19/183 384/477 |
| 5,245,823 A | 9/1993 | Barcza | |
| 5,288,354 A | 2/1994 | Harris et al. | |
| 5,417,056 A | 5/1995 | Johnson et al. | |
| 5,615,967 A | 4/1997 | Hellon | |
| 5,775,815 A | 7/1998 | Abusamra | |
| 5,839,699 A | 11/1998 | Bliesner | |
| 5,839,835 A | 11/1998 | Zernickel et al. | |
| 5,893,518 A | 4/1999 | Bruchez, Jr. et al. | |
| 6,149,105 A | 11/2000 | Jaggard | |
| 6,159,105 A | 11/2000 | Jaggard | |
| 6,173,824 B1 | 1/2001 | Roberts | |
| 6,180,574 B1 | 1/2001 | Ryan et al. | |
| 6,365,556 B1 | 4/2002 | Drew | |
| 6,742,324 B2 | 6/2004 | Bachelder et al. | |
| 6,921,249 B1 | 7/2005 | Haynie et al. | |
| 6,926,446 B2 | 8/2005 | Grehn et al. | |
| 6,994,475 B2 | 2/2006 | Doll et al. | |
| 7,097,361 B2 | 8/2006 | Rogers | |
| 7,249,735 B2 | 7/2007 | Amorosi et al. | |
| 7,427,163 B2 | 9/2008 | Schöder et al. | |
| 7,641,152 B2 | 1/2010 | Onu et al. | |
| 7,828,482 B2 | 11/2010 | Beausoleil et al. | |
| 7,878,714 B2 | 2/2011 | Arnault et al. | |
| 7,909,717 B2 | 3/2011 | Boussaguet et al. | |
| 7,938,583 B2 * | 5/2011 | Tanaka | F16C 33/44 384/463 |
| 8,021,053 B2 | 9/2011 | Habibvand | |
| 8,025,257 B2 | 9/2011 | Gyuricsko et al. | |
| 8,034,865 B2 * | 10/2011 | Hamel | F16C 33/12 524/404 |
| 8,387,924 B2 | 3/2013 | Gyuricsko et al. | |
| 8,393,799 B2 | 3/2013 | Dahl | |
| 8,684,316 B2 | 4/2014 | Sakurai et al. | |
| 8,763,953 B2 | 7/2014 | Sakurai et al. | |
| 2004/0022464 A1 | 2/2004 | Schinazi et al. | |
| 2007/0102587 A1 | 5/2007 | Jones et al. | |
| 2007/0189649 A1 | 8/2007 | Montazeri et al. | |
| 2007/0223850 A1 | 9/2007 | Lopes et al. | |
| 2007/0232502 A1 | 10/2007 | Tsutsui et al. | |
| 2008/0230629 A1 | 9/2008 | Martin | |
| 2009/0235643 A1 | 9/2009 | Schirtzinger | |
| 2010/0008612 A1 | 1/2010 | Grehn | |
| 2010/0135606 A1 | 6/2010 | Ehlert et al. | |
| 2010/0152926 A1 | 6/2010 | Onu et al. | |
| 2010/0269629 A1 | 10/2010 | Nunn et al. | |
| 2011/0019952 A1 | 1/2011 | Gutowski et al. | |
| 2011/0038576 A1 | 2/2011 | Thornton et al. | |
| 2011/0067509 A1 | 3/2011 | Kleibl et al. | |
| 2011/0142532 A1 | 6/2011 | Diemirbey | |
| 2011/0220760 A1 | 9/2011 | Gyuricsko et al. | |
| 2011/0220762 A1 * | 9/2011 | Gyuricsko | B64C 9/22 244/99.3 |
| 2012/0058923 A1 | 3/2012 | Hamel et al. | |
| 2012/0091283 A1 * | 4/2012 | Uchida | B64C 9/02 244/213 |
| 2012/0248723 A1 * | 10/2012 | Harper | F16C 11/0614 280/93.512 |

FOREIGN PATENT DOCUMENTS

| | | |
|---|---|---|
| EP | 0230681 A2 | 8/1987 |
| EP | 0771956 A1 | 5/1997 |
| EP | 0843106 A1 | 5/1998 |
| EP | 0520968 B2 | 3/2000 |
| EP | 1875090 A1 | 1/2008 |
| EP | 1975399 A2 | 10/2008 |
| EP | 2067696 A2 | 6/2009 |
| EP | 2336584 A2 | 6/2011 |
| GB | 2048181 * | 12/1980 |
| GB | 2213113 A | 8/1989 |
| GB | 2304656 A | 3/1997 |
| JP | Sho57-184721 A | 11/1982 |
| JP | Sho62113697 A | 5/1987 |
| JP | 9-236120 * | 9/1997 |
| JP | H09236120 A | 9/1997 |

(56) References Cited

FOREIGN PATENT DOCUMENTS

| | | |
|---|---|---|
| JP | H10252745 A | 9/1998 |
| JP | 2006-300130 | 11/2006 |
| WO | 9617179 A1 | 6/1996 |
| WO | 1996017179 A1 | 6/1996 |
| WO | 2006114237 A1 | 11/2006 |
| WO | 2008076011 A1 | 6/2008 |
| WO | 2008147284 A1 | 12/2008 |
| WO | 2012080983 A1 | 6/2012 |
| WO | 2012129223 A1 | 9/2012 |

OTHER PUBLICATIONS

Office Action for European Patent Application No. 12809904.1-1754, dated May 6, 2016, pp. 1-6.
International Search Report for corresponding PCT/US2013/038626 dated Jan. 13, 2014.
Office Action for Canadian Patent Application No. 2643029, dated Oct. 5, 2010.
Office Action for Chinese Patent Application No. 200810181713.7, dated Apr. 1, 2010.
European Search Report issued in corresponding European Patent Application No. 08168716 dated Mar. 14, 2012.
EPO communication for European Patent Application No. 08168716.2-2422, dated Oct. 18, 2011.
EPO communication for European Patent Application No. 08168716.2-2422, dated Nov. 27, 2012.
"The extreme tests planes go through before taking off" Katia Moskvitch, Mar. 18, 2014, https://www.bbc.com/future/article/20140319-stress-tests-for-safer-planes.
Extended European Search Report for European Patent Application No. 14172751.1-1751 / 2840272, dated Sep. 18, 2015.
International Preliminary Report on Patentability for PCT Application No. PCT/US2012/029797, dated Oct. 3, 2013.
International Preliminary Report on Patentability for PCT Application No. PCT/US2012/068236, dated Apr. 24, 2014.
International Search Report for PCT Application No. PCT/US2012/029797, dated Aug. 7, 2012.
International Search Report for PCT Application No. PCT/US2012/068236, dated Feb. 21, 2013.
International Search Report for PCT Application No. PCT/US2013/038626, dated Jan. 20, 2014.
International Search Report for PCT Application No. PCT/US2013/076557, dated Jun. 5, 2014.
Office Action issued in Japanese Patent Application No. 2012-276286, dated Dec. 24, 2013.
Office Action issued in Japanese Patent Application No. 2008-302409, dated Mar. 28, 2012.
Office Action issued in Japanese Patent Application No. 2008-302409, dated Jul. 29, 2011.
"RBC Aerospace Bearings Swage Tubes and Control Rods" ISO 9001:2000; AS9100B: 2004.
Development of Variable Camber Continuous Trailing Edge Flap for Performance Adaptive Aeroelastic Wing, NASA Ames Research Center and Boeing Research and Technology, pp. 1-33.
JP Reasons for Refusal for 2012-276286 dated Jan. 28, 2014.
JP Decision of Rejection against JP Patent Application No. 2012-276286, dated Dec. 26, 2014.
Du Pont Company, Properties Handbook, "Teflon PTFE fluoropolymer resin," dated Jul. 1996, No. 220313D, bearing reorder No. H-37051-3 (replacing H-37051-2), pp. 1-38.
Department of Defense, Department of Defense Handbook, Bearings, Control System Components, and Associated Hardware Used in the Design and Construction of Aerospace Mechanical Systems and Subsystems, MIL-HDBK-1599A, dated Oct. 2, 1997, pp. 1-188.
787 Uses Flaps in Cruise, Dec. 2018.
Report 1235, Standard Atmosphere—Tables and Data for Altitudes to 65,800 feet, International Civil Aviation Organization and Langley Aeronautical Laboratory, pp. 1-119.
Getting to Grips with Cold Weather Operations, A Flight Operations View, Airbus Industrie 2000, p. 1-154.
787 Systems and Performance, Tim Nelson, Flight Operations Engineering, Boeing Commercial Airplanes, 2005, pp. 1-36.
Cold Temperature Restricted Airports, Notices to Airmen, Aug. 15, 2019, http://www.faa.gov/air_traffic/flight_info/aeronav/digital_products/dtpp/search.
"Do airplanes need brakes in the air?", Aviation Stack Exchange, https://aviation.stackexchange.com/questions/71309/do-airplanes-need-brakes-in-the-air.
"Emergency Descent: Guidance for Flight Crews," https://www.skybrary.aero/index.php/Emergency_Descent:_Guidance_for_Flight_Crews.
"Behind the scenes: What goes on in the flight deck during a rapid descent," Charlie Page, Sep. 28, 2019, https://thepointsguy.com/guide/rapid-descent-flight-deck/.
"Green Aviation," Edited by R Agarwal, F Collier, A Schafer, A Seabridge, Editors in Chief, R Blockley, W Shyy, 2016, John Wiley & Sons Ltd, West Sussex, United Kingdom, Forward, p. xvi, and Chapter 8, "Fuel Burn Reduction Through Wing Morphing," Joaquim R.R.A Martins, Aerospace Engineering Department, University of Michigan, Ann Arbor, MI, USA, pp. 73-79.
A350-900 Flight Deck and Systems Briefing for Pilots, Issue 02—Sep. 2011, Airbus SAS, 31707 BLAGNAC Cedex—France, (https://www.smartcockpit.com/docs/a350-900-flight-deck-and-systems-briefing-for-pilots.pdf) p. Forward, xvi, 173, 174.
The Next Decade in Commercial Aircraft Aerodynamics—A Boeing Perspective, Mark Gold Hammer, Chief Aerodynamicist, Boeing Commercial Airplanes, Seattle, Washington, USA, presented at Aerodays 20011, Madrid, Spain, Mar. 31, 2011 (http://www.cdti.es/recursos/doc/eventoscdti/aerodays2011/5g1.pdf).
Boeing unveils plans for trailing edge variable camber on 787 to reduce drag, save weight, Jun. 12, 2006, Guy Norris, Seattle, WA (https://www.flightglobal.com/boeing-unveils-plans-for-trailing-edge-variable-camber-on-787-to-reduce-drag-save-weight/67868.article).
Society of Tribologists and Lubrication Engineers, "Back and forth with oscillating bearings," Mary Beckman, Contributing Editor, TLT Feature Jun. 2020 (https://www.stle.org/files/TLTArchives/2020/06_June/Feature.aspx).
Flight Safety Foundation, Aviation Mechanics Bulletin, "Preventing Fretting Damage Becomes Increasingly Critical as Aircraft Age," Nov.-Dec. 1998.
"World's most extreme airports", Miguel Ros, CNN, updated Jun. 5, 2018, this article appears in at least two places: https://www.kxly.com/the-worlds-most-extreme-airports/ and https://www.cnn.com/travel/article/most-extreme-airports-world/index.html.
"About Yakutia Airlines" https://airrussia.us/about/partners/yakutia-airlines/.
"Yakutia Airlines Fleet Details and History" listed on https://www.planespotters.net/airline/Yakutia-Airlines.
"Airbus Notes: Training Notes for A319/32/321", Eric Parks, copyright 1999-2021, http://www.airbusdriver.net/airbusnotes.pdf, p. 5.
"Boeing 737-600/-700/-800/-900 Operations Manual," The Boeing Company, Document No. D6-27370-TBC, Nov. 20, 1997, Revision 10 dated Sep. 30, 2002, http://toulouse747.com/wp-content/uploads/2018/12/Boeing-B737-700-800-900-Operations-Manual.pdf, p. 126.
Department of Defense Handbook, Global Climatic Data for Developing Military Products, MIL-HDBK-310, Jun. 23, 1997, sections 5.3.1.2 Low Temperatures (pp. 36-37, Table XX, p. 90).
D.P. Bein, "In-Flight Suppressant Deployment Temperatures," Naval Air Systems Command (NAVAIR), Feb. 28, 2006, p. 2 (p. 5 of the pdf document).

* cited by examiner

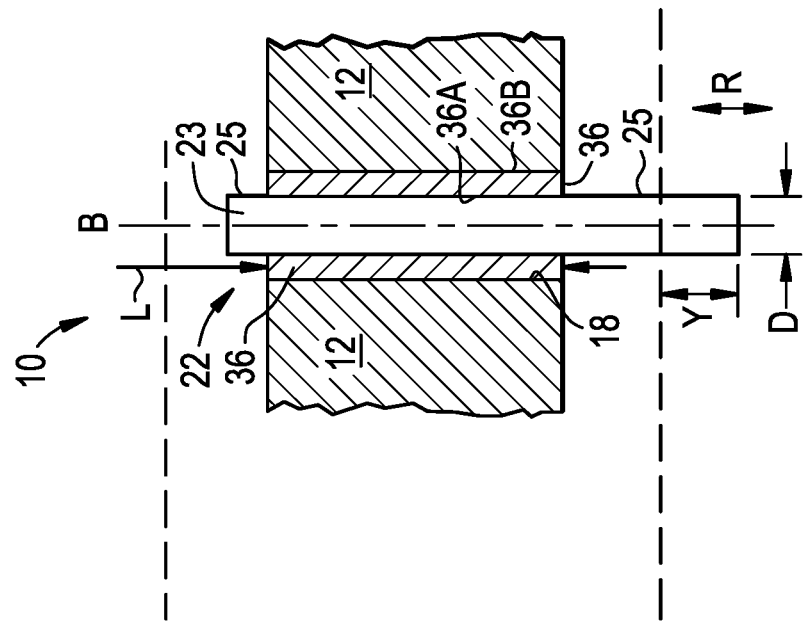
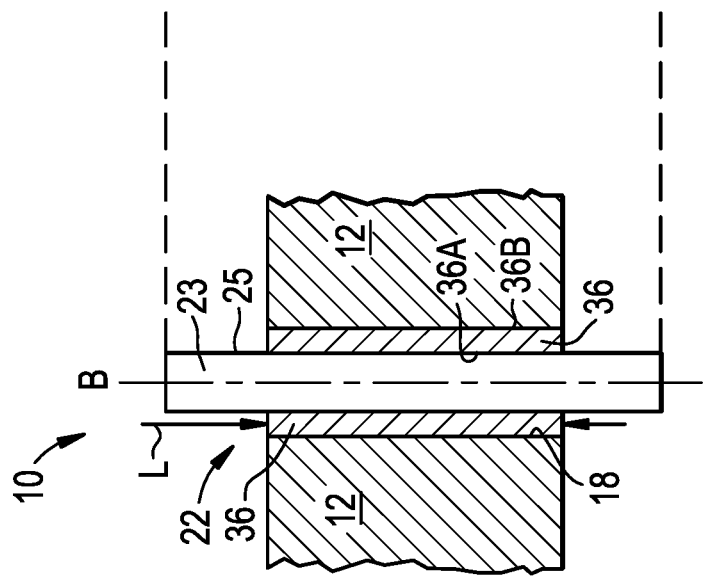

HYBRID BEARING ASSEMBLY WITH ROLLING ELEMENTS AND PLAIN BEARING

TECHNICAL FIELD

The present invention is directed to bearings and, more particularly, to hybrid bearings for use in fixed wing aircraft flap hinge arms.

BACKGROUND

The wings of a fixed wing aircraft typically employ ailerons and flaps that are mounted on hinges longitudinally along the wings. Ailerons are flight control surfaces that are hinged to the trailing edges of the wing and are independently movable up and down to deflect airflow away from the wing, thereby altering the lift on the wing and controlling the roll moment of the aircraft as well as allowing the plane to bank. Flaps are flight control surfaces that are also hinged to the trailing edges of the wings but are movable in tandem up or down. Angling the flaps down to deflect airflow down and away from the wing reduces the flight speed and allows the angle of descent to be increased without increasing air speed. In larger aircraft, the flaps are also generally extendable outward from the trailing edges.

In using the flaps, however, the curvature of the wing is increased. Because the flaps are mounted along the wings in the directions in which the wings extend, increasing the curvature of a wing causes stress at the points at which the flaps are coupled to the wing. Bearings are used at these points in conjunction with linkages to enable the flaps to be extended and angled in response to pilot control. Placing stresses on the points at which the flaps are coupled to the wings may compromise the operation of the bearings, which in turn may affect the positioning of the flaps and operation of the aircraft.

U.S. Patent Application Publication No. 2011/0220762 discloses an aircraft wing that includes a wing structure, a slat panel mounted on a track, and an actuator mechanism on the wing structure coupled to the track for moving the slat panel between a deployed position and a retracted position. Track roller bearings on the wing structure rotatably contact the track, and side roller bearings on the wing structure rotatably contact at least one side of the track. In another configuration, the actuator mechanism includes a shaft rotatably mounted on the wing structure, an actuator arm coupled to the track by a bearing linkage, and an actuator lever coupled to the shaft by a bearing linkage and to the actuator arm by a bearing linkage. At least one bearing linkage includes a spherical plain bearing. In addition, U.S. Patent Publication No. 2011/067509, German Patent Application No. 197 50 113, U.S. Pat. No. 1,457,584, U.S. Patent Publication No. 2012/058923, European Patent Application No. 0 843 106 and International Patent Application Publication No. WO 2012/080983 are also relevant to the present application.

SUMMARY

In one aspect, the present invention resides in a bearing assembly comprising: an outer race having an inner surface defining a concave contour; an inner race positioned in the outer race, the inner race having an inner surface defining a bore therethrough and an outer surface defining at least one groove circumscribing the outer surface; a plurality of rolling elements rollably located in the at least one groove and in rolling contact with the inner surface of the outer race; and a lubricious liner having an inner liner-surface and an exterior liner-surface, the exterior liner-surface being disposed on the inner surface defining the bore, the lubricious liner having a modulus of compression of a magnitude sufficient to allow misalignment of the inner liner-surface relative to the exterior liner-surface in response to a force applied thereto.

In another aspect, the present invention resides in a bearing assembly comprising: an outer race having an inner surface defining a concave contour; an inner race positioned in the outer race, the inner race having an inner surface defining a bore therethrough and an outer surface defining at least one groove circumscribing the outer surface; a plurality of rolling elements rollably located in the at least one groove and in rolling contact with the inner surface of the outer race; and a lubricious liner having a coefficient of friction of a magnitude sufficient to prevent relative motion between the inner race and a shaft extending through the bore of the inner race during a first operating condition and to allow relative motion between the inner race and the shaft during a second operating condition.

In another aspect, the present invention resides in a flap hinge arm of a fixed wing aircraft, comprising: an arm; a connecting rod pivotally connected to the arm and pivotally connectable to a flap; and a bearing assembly positioned on the arm and connectable to a wing of the fixed wing aircraft, the bearing assembly comprising, an outer race having an inner surface defining a concave contour; an inner race positioned in the outer race, the inner race having an inner surface defining a bore therethrough and an outer surface defining at least one groove circumscribing the outer surface; a plurality of rolling elements rollably located in the at least one groove and in rolling contact with the inner surface of the outer race; and a lubricious liner having an inner liner-surface and an exterior liner-surface, the exterior liner-surface being disposed on the inner surface defining the bore, the lubricious liner having a modulus of compression of a magnitude sufficient to allow misalignment of the inner liner-surface relative to the exterior liner-surface in response to a force applied thereto, and a coefficient of friction of a magnitude sufficient to prevent relative motion between the inner race and a shaft extending through the bore of the inner race during a first operating condition and to allow relative motion between the inner race and the shaft during a second operating condition.

BRIEF DESCRIPTION OF THE DRAWINGS

FIG. 3A presents another embodiment of the bearing assembly of FIG. 1 in a first operating condition.

FIG. 3B presents the bearing assembly of FIG. 3A in a second operating condition.

FIGS. 5-8 is installed.

DETAILED DESCRIPTION

Figure 1:
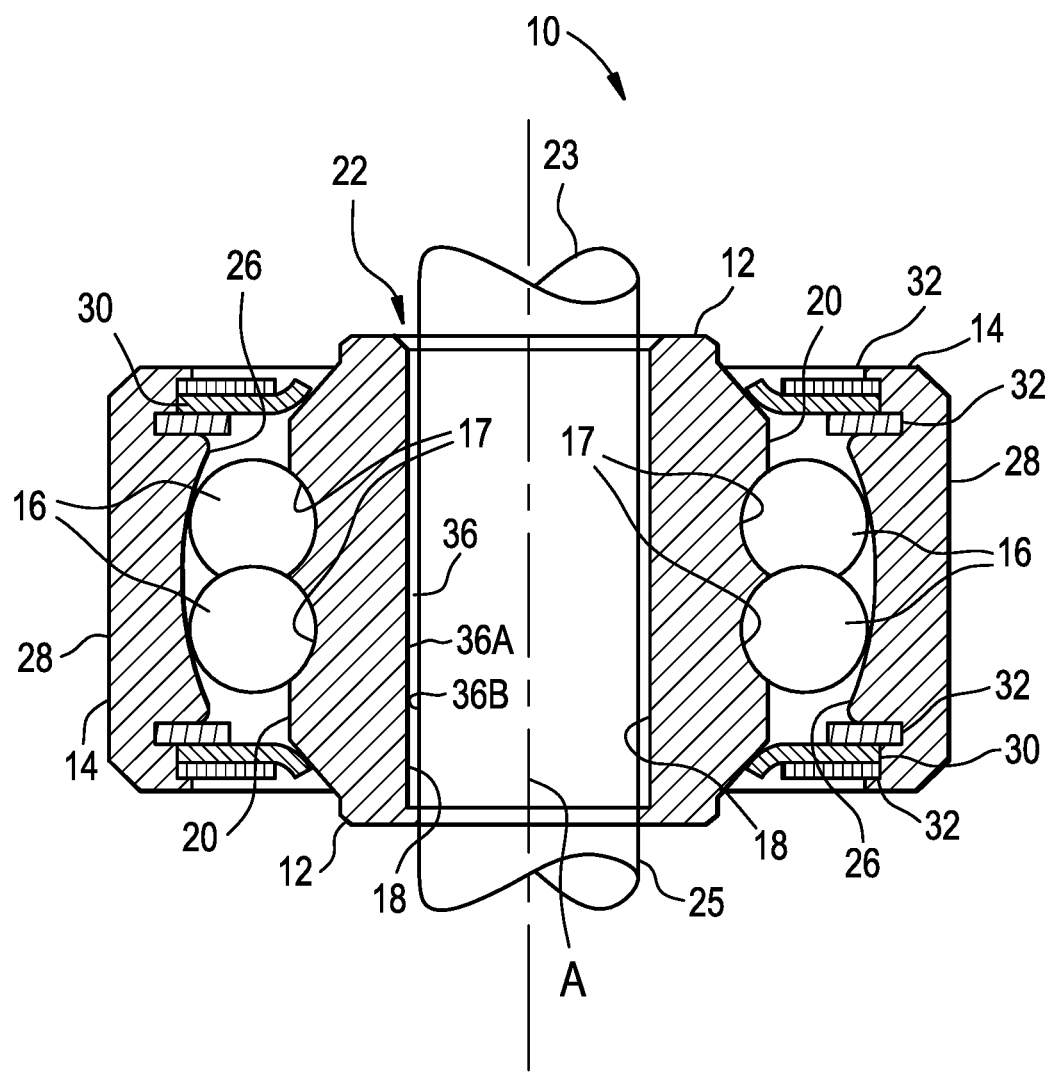
FIG. 1 is a side sectional view of a bearing assembly, of the present invention.

As shown in FIG. 1, an airframe control bearing assembly for use with an aircraft flap hinge arm is designated generally by the number 10 and is hereinafter referred to as "bearing assembly 10." Bearing assembly 10 is a hybrid bearing that combines the misalignment (swivel action) capabilities of a plain spherical bearing and the rolling element aspect of an airframe control bearing, with a third degree of freedom which includes axial sliding of the bearing on a self-lubricated surface thus allowing for the accommodation of a greater degree of misalignment (e.g., rotational, tilt or cocking, and axial sliding) as compared to conventional bearings used in flap hinge arms. In particular, the range of motion of oscillation can be up to about 45 degrees. The present invention is not limited to an oscillation range of motion of about 45 degrees, however, as the oscillation of the bearing assembly may be greater than about 45 degrees.

In the illustrated embodiment, the bearing assembly 10 comprises an inner race 12 concentrically positioned in an outer race 14. A plurality of rolling elements or balls 16 are located between and rollingly engage the inner and outer races, 12 and 14 respectively. The present invention is not limited to the use of balls 16, however, as any suitable rolling element may be employed. The inner race 12 is defined by an inner surface 18 and an outer surface 20. The outer surface 20 includes two grooves 17 that circumscribe the outer surface 20. At least a portion of the balls 16 rollingly engage each of the grooves 17. As illustrated, the balls 16 are arranged in two staggered rows such that each ball is staggered relative to the next adjacent ball. The inner surface 18 defines a bore 22 extending through the inner race 12, the bore being located substantially concentrically about an axis A.

In the illustrated embodiment, the outer race 14 is a ring that is defined by an inner surface 26 having a spherically concave contour and an outer surface 28. The concave contour of the outer race inner surface 26 allows for the inner race 12 to be misaligned relative to the outer race 14 by up to about 45 degrees to accommodate the oscillation range of motion of bearing assembly 10 as described above. The balls 16 rollingly engage the inner surface 26. The outer surface 28 is suitably configured to facilitate the mounting of the bearing assembly 10 in a flap hinge arm. Upon incorporation of the bearing assembly 10 into the flap hinge arm, the outer race 14 and the inner race 12 rotate independently of each other. While the outer race 14 has been shown and described as being a ring, the present invention is not limited in this regard as the outer race can assume any practical shape or be integral with the flap hinge arm into which the bearing assembly 10 is installed without departing from the broader aspects of the present invention.

The bearing assembly 10 includes a seal 30 positioned across the interface of the inner race 12 and the outer race 14 to inhibit the ingress of debris and contaminants into the bearing assembly. Retaining rings 32 are employed on the outer race 14 on opposing sides of the seals 30 to secure the seals in place. The bearing assembly 10 may include two seals 30 positioned generally opposite one another on opposing sides of the bearing assembly.

The balls 16 may be made from a steel or an alloy steel. For example, the balls 16 may be made from a stainless steel such as 440C (AMS 5880 or 5618), 52100 (AMS 6440), or Corrosion Resistant Nitrogen ("CREN") Steel (e.g., Cronidur 30® (available from Progressive Alloy Steels Unlimited of Las Vegas, Nev.), AMS 5898, or other suitable CREN when available), or the like. It is also contemplated that the balls 16 may be made from other materials that are sufficiently hard or can be sufficiently hardened through heat treatment.

Both the inner race 12 and the outer race 14 may be made from a steel or an alloy steel, including, but not limited to, a stainless steel such as 440C (AMS 5880 or 5618), AMS 5655 solution nitride (CREN), 52100 (AMS 6440), Cronidur 30® (AMS 5898), or Aubert and Duvall XD15NW®, or another suitable material.

Figure 2A:
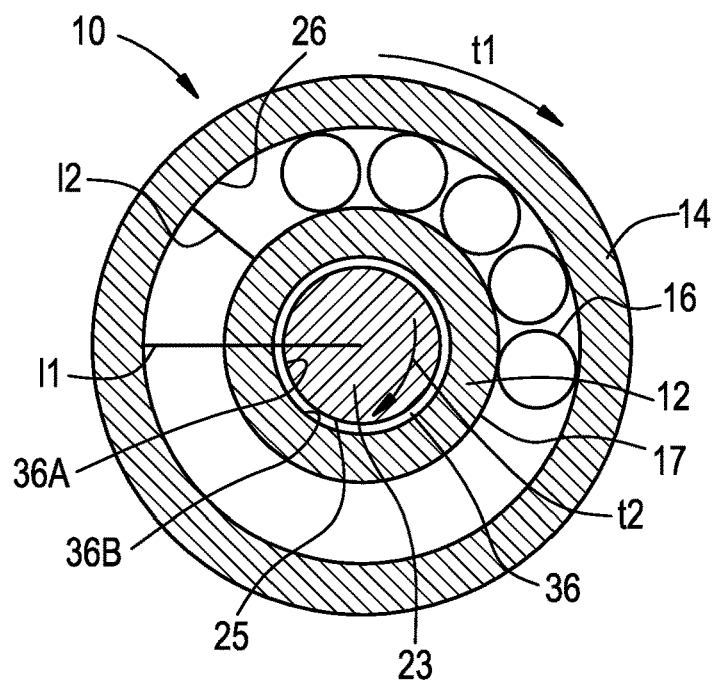
FIG. 2A presents one embodiment of the bearing assembly of FIG. 1 in a first operating condition.
Figure 2B:
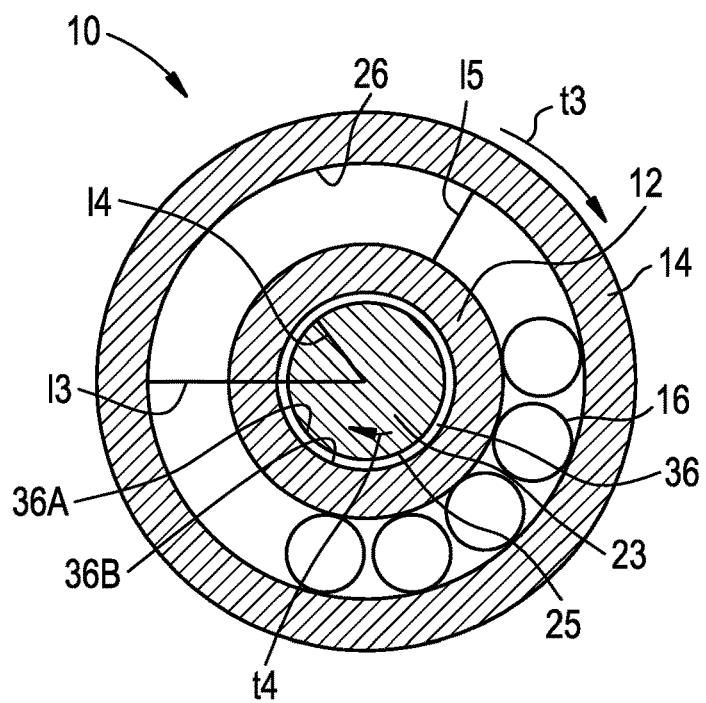
FIG. 2B presents the bearing assembly of FIG. 2A in a second operating condition.

The bearing assembly 10 also includes a self-lubricating coating composition bonded to the inner surface 18 defining the bore 22 to form a lubricious liner 36 having an inner liner-surface 36B and an exterior liner-surface 36A. As illustrated in FIG. 1, the bearing assembly 10 is mounted on a shaft 23 which extends through the bore 22. The shaft 23 is substantially cylindrical and defines an exterior surface 25. The lubricious liner 36 is disposed between the shaft 23 and the bore 22. The lubricious liner inner liner-surface 36B engages the exterior surface 25 of the shaft 23; and the lubricious liner exterior liner-surface 36A engages the inner surface 18 defining the bore 22. The shaft 23 is press fit into the bore 22 so that during normal operation of the bearing assembly 10 the shaft 23 is fixed relative to the inner race 12 and there is essentially no slippage between the lubricious liner 36 and the exterior surface 25. As shown in FIGS. 2A and 2B, the lubricious liner 36 has a continuous annular shape. As shown in FIGS. 3A and 3B the lubricious liner 36 has an axial length L. The interior liner-surface 36B engages the exterior surface 25 of the shaft 23, continuously and entirely circumferentially around the shaft 23 (e.g., uninterrupted), along the axial length L of the lubricious liner 36. The exterior liner-surface 36A engages the inner surface 18, continuously and entirely circumferentially around the inner surface 18 (e.g., uninterrupted), along the axial length L of the lubricious liner 36.

The coefficient of friction of the lubricious liner 36 is of a magnitude sufficient to prevent relative motion between the inner race 12 and the shaft 23 extending through the bore 22 during a first operating condition and to allow relative motion between the inner race 12 and the shaft 23 during a second operating condition, both in a radial direction and in an axial direction. For example, during a first operating condition, referred to herein as "normal operation," as shown in FIG. 2A, a first operating torque t1 is transmitted to the outer race 14 which rotates in relation to inner race 12 by action of the balls 16. A second operating torque t2 is transmitted to the lubricious liner 36 and correspondingly to the shaft 23. The lubricious liner 36 has a static coefficient of friction of a sufficient magnitude to maintain the shaft 23 in a substantially fixed relation to the inner race 12 and the lubricious liner 36 during normal operation when the first operating torque is in the range up to torque t1 and the second operating torque is in the range up to torque t2. For illustrative purposes, an indicator I1 indicates a first position of bearing 10 during normal operation wherein the indicator I1 of the shaft 23, lubricious liner 36, inner race 12, and outer race 14 align. Upon torque t1 being transmitted to bearing 10, the outer race rotates as indicated by an indicator 12 while the indicator I1 of the shaft 23, lubricious liner 36 and inner race 12 remains stationary.

In contrast, during a second operating condition, referred to herein as "anomalous operation," as shown in FIG. 2B, a third operating torque, or an anomalous operation torque t3 in excess of normal operating torque t1, is transmitted to the outer race 14 which rotates in relation to inner race 12 by action of the balls 16. A fourth operating torque, or an anomalous operation torque t4 in excess of normal operating torque t2, is transmitted to the inner race 12, lubricious liner 36 and correspondingly to the shaft 23. The coefficient of friction of the lubricious liner 36 is of a sufficient magnitude to enable rotational sliding engagement between the exterior surface 25 of shaft 23 and the lubricious liner 36 when friction between the inner race 12 and the outer race 14 exceeds a predetermined magnitude thereby causing anomalous operation. For illustrative purposes, an indicator 13 indicates a first position of bearing 10 during anomalous operation wherein the indicator 13 of the shaft 23, lubricious liner 36, inner race 12, and outer race 14 align. Upon torque t3 being transmitted to bearing 10, the outer race rotates as indicated by an indicator 15, and the shaft 23 also rotates in relation to the lubricious liner 36 and inner race 12 as indicated by an indicator 14. In such a case, outer race 14 may rotate less than rotation under normal operation (i.e., the outer race 14 is rotating under anomalous operation), or the outer race 14 may remain stationary in relation to the inner race 12. If rotation of the outer race 14 relative to the inner race 12 is impeded by seizure of the balls 16, the inner race 12 and lubricious liner 36 will move relative to the shaft 23 and the exterior surface 25 slides relative to the lubricious liner 36. The lubricious liner 36 is operable to engage a mating surface and to enable sliding engagement with the mating surface when torque required to rotate the outer race 14 relative to the inner race 12, exceeds a predetermined value.

Under normal operation, an axial force defined as equal to or less than an axial holding force is transmitted to the interface of the lubricious liner 36 and the shaft 23 wherein lubricious liner 36 is operable to engage and retain shaft 23. Under anomalous operation, an axial force greater than the axial holding force, defined as an axial break-away force, is transmitted to the interface of the lubricious liner 36 and the shaft 23 wherein lubricious liner 36 is operable to permit axial sliding or shifting of shaft 23. In one embodiment, the predetermined value of a torque applied to bearing 10 is normal operating torque t1, and anomalous operation torque t3 is in a range of magnitude of about 1.5 normal operating torque t1. In another embodiment, the predetermined value of a torque applied to bearing 10 is normal operating torque t1, and anomalous operation torque t3 is in a range of magnitude of about 1.25 normal operating torque t1. In another embodiment, the predetermined value of a torque applied to bearing 10 is normal operating torque t1, and anomalous operation torque t3 is in a range of magnitude of about 1.1 normal operating torque t1. Furthermore, the lubricious liner 36 also functions as a fail-safe mechanism by allowing the shaft to rotational slip in the bore 22 if the bearing were to seize.

As also shown in FIG. 3A, the bearing assembly 10 is mounted on the shaft 23 which is a least partially disposed in the bore 22 and exterior surface 25 of shaft 23 engages the lubricious liner 36. The lubricious liner 36 reduces friction between exterior surface 25 of shaft 23 received in or through the bore 22 and the inner surface 18 defining the bore particularly when forces (for example, as a result of wing bending or thermal differentials) act on the shaft in directions indicated by the arrow R and parallel to an axis B. The bearing assembly 10 may also translate along the shaft to some degree with reduced friction because of the presence of the lubricious liner 36. As described above, the coefficient of friction of the lubricious liner 36 is of a magnitude sufficient to prevent relative motion between the inner race 12 and the shaft 23 extending through the bore 22 during a first operating condition and to allow relative motion between the inner race 12 and the shaft 23 during a second operating condition. As shown in FIG. 3B, when forces act on shaft 23 in directions R parallel to axis B during a second operating condition, exterior surface 25 of shaft 23 engages the lubricious liner 36 and moves in the direction R a distance Y in relation to inner surface 18 of bore 22. Distance Y can be represented in relation to an outer diameter D of shaft 23. In one embodiment, distance Y is in the range of about 0.25 D. In one embodiment, distance Y is in the range of about 0.5 D. In one embodiment, distance Y is in the range of about D. In one embodiment, distance Y is in the range of about 2 D. The lubricious liner 36 also removes the need for the incorporation of a galvanic barrier on the bearing assembly 10 or the shaft in the event that the surface defining the bore 22 is a different material than the material of the shaft.

Figure 4A:
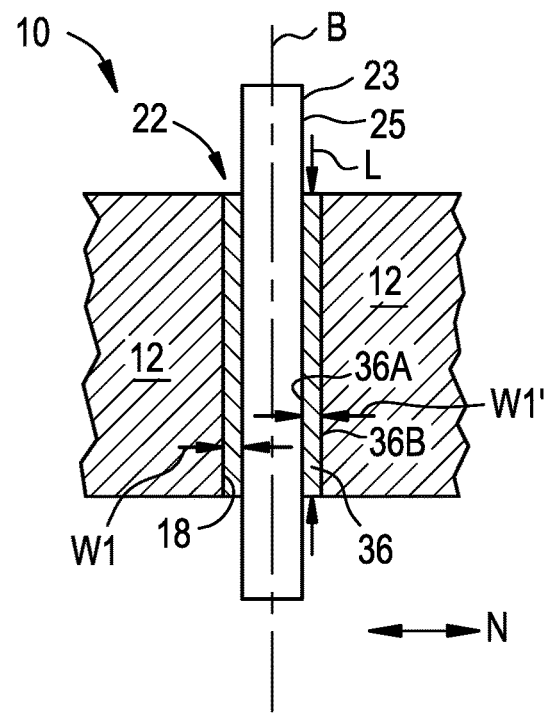
FIG. 4A presents another embodiment of the bearing assembly of FIG. 1 in a first operating condition.
Figure 4B:
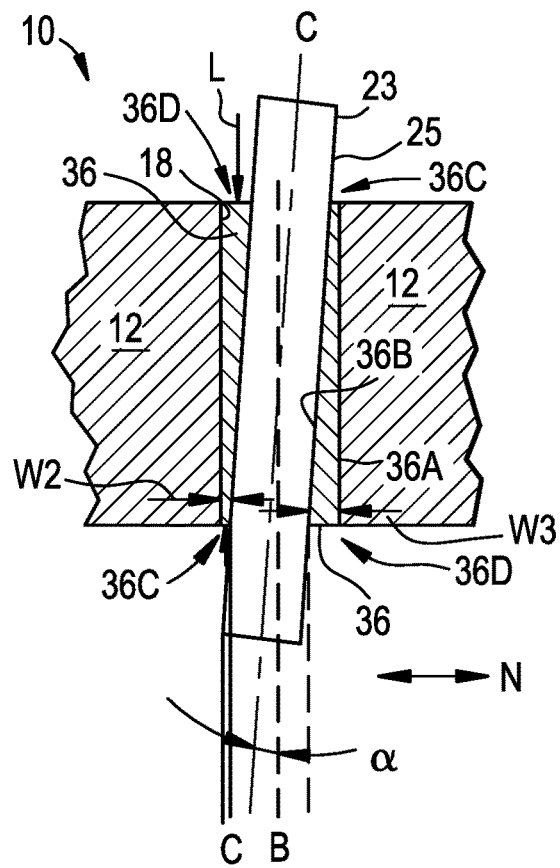
FIG. 4B presents the bearing assembly of FIG. 4A in a second operating condition.

As shown in FIGS. 4A and 4B, the lubricious liner 36 has a modulus of compression of a magnitude sufficient to allow misalignment (e.g., axial angular misalignment) of the lubricious liner inner liner-surface 36B disposed on the exterior surface 25 of the shaft 23 relative to the lubricious liner exterior liner-surface 36A disposed on the inner surface 18 defining the bore 22 in the inner race 12 in the directions generally indicated by the arrow N in response to a force applied thereto. As such, lubricious liner 36 provides for an axial angular misalignment of the shaft 23 in relation to the inner race 12. The bearing assembly 10 is mounted on the shaft 23 which is a least partially disposed in the bore 22 and exterior surface 25 of shaft 23 engages the lubricious liner 36. The lubricious liner 36 has a modulus of compression of a magnitude sufficient to maintain the lubricious liner inner liner-surface 36B in a substantially fixed relation to the lubricious liner exterior liner-surface 36A during normal operation such shaft 23, lubricious liner 36 and inner race 12 are substantially concentric about a central axis B.

Upon application of a force or load in the direction N, the lubricious liner 36 has a modulus of compression of a magnitude sufficient to allow angular misalignment (i.e., an angular misalignment feature) of the inner race 12 relative to the shaft 23 such that a central axis C of shaft 23 is displaced or misaligned from the axis B of bore 22 by a misalignment angle α. As a result, shaft 23, lubricious liner 36 and inner race 12 are no longer concentric. In one embodiment, the misalignment angle α is from about one degree to about two degrees. In another embodiment, the misalignment angle α is from about one degree to about ten degrees. In one embodiment, the misalignment angle α is up to about 15 degrees. Referring to FIG. 4A, the lubricious liner 36 surrounds the shaft 23 and has a substantially equal thickness W1, W1' a full 360° around exterior surface 25 between first end 36C and second end 36D. Lubricious liner 36 has a modulus of compression of a magnitude sufficient to allow sufficient compression of a width W1 of the liner and correspondingly allow sufficient expansion of width W1' such that lubricious liner inner liner-surface 36B remains disposed on exterior surface 25 of shaft 23 and lubricious liner exterior liner-surface 36A remains disposed on inner surface 18 of bore 22 of inner race 12. As such, lubricious liner inner liner-surface 36B remains in full contact with exterior surface 25 of shaft 23 and lubricious liner exterior liner-surface 36A remains in full contact with inner surface 18 of bore 22 of inner race 12. As shown in FIG. 4B, in one embodiment, a portion of width W1 is compressible at the first end 36C to a width W2 and another portion of width W1' is correspondingly expandable to a width W3. At the second end 36D, a portion of the width W1 is compressible to width W2 and another portion of the width W1' is expandable to width W3. In one embodiment, a portion of width W1 is compressible to width W2 and another portion of width W1' is expandable to width W3 up to a range of about 10% of width W1. In one embodiment, a portion of width W1 is compressible to width W2 and another portion of width W1' is expandable to width W3 up to a range of about 25% of width W1. In one embodiment, a portion of width W1 is compressible to width W2 and another portion of width W1' is expandable to width W3 up to a range of about 50% of width W1.

The lubricious liner 36 includes polytetrafluoroethylene (PTFE). The PTFE may be in fiber form and woven with fabrics, such as, but not limited to, cotton, polyester, glass fiber, carbon fiber, nylon, aramid materials such as NOMEX® and KEVLAR® manufactured by DuPont, and combinations of the foregoing. When the PTFE is woven with fabric, the fabric may be set in a thermosetting resin or thermoplastic resin. Examples of thermosetting resins include, but are not limited to, phenolic resins, polyester resins, epoxy resins, urethane resins, polyurethane resins, polyimide resins, and the like. In an alternative embodiment, the lubricious liner 36 includes the woven PTFE fiber and chopped PTFE fibers in addition to the other fibers and resins listed above. In yet another embodiment, the lubricious liner 36 includes chopped PTFE fibers in addition to the other fibers and resins listed above and does not include the woven PTFE fiber.

In another embodiment, the lubricious liner 36 could be molded to or injected and adhered onto the inner surface 18 defining the bore 22. In such an embodiment, the lubricious liner 36 includes a thermosetting resin, such as a phenolic resin, a polyester resin, an epoxy resin, a urethane resin, a polyurethane resin, a polyimide resin, or the like, which is mixed with any one or a combination of fibers such as PTFE, cotton, polyester, glass fiber, carbon fiber, nylon, and aramid fibers such as NOMEX® and KEVLAR®.

Figure 5:
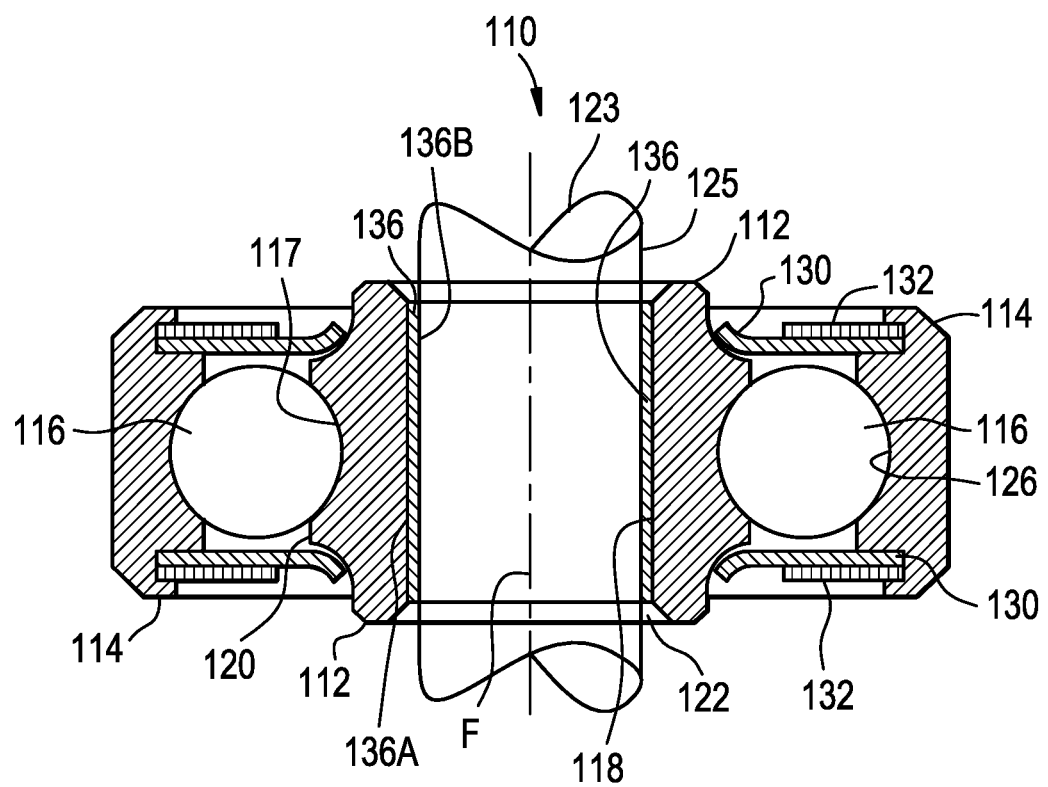
FIG. 5 is a side sectional view of another embodiment of a bearing assembly of the present invention.
Figure 6:
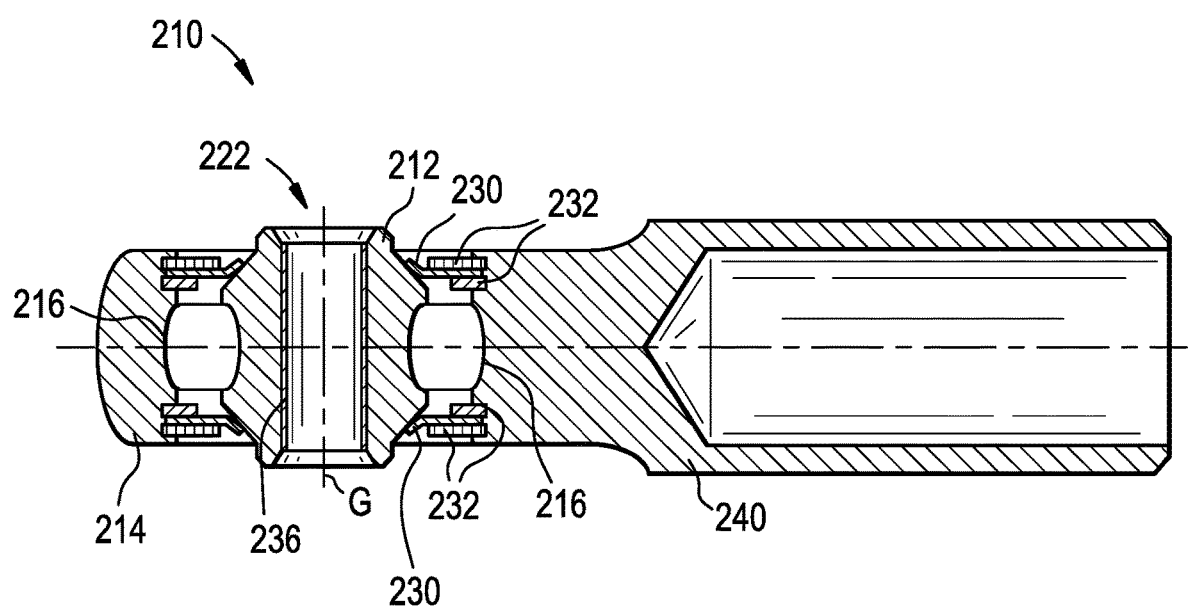
FIG. 6 is a side sectional view of yet another alternate embodiment of a bearing assembly of the present invention.
Figure 7:
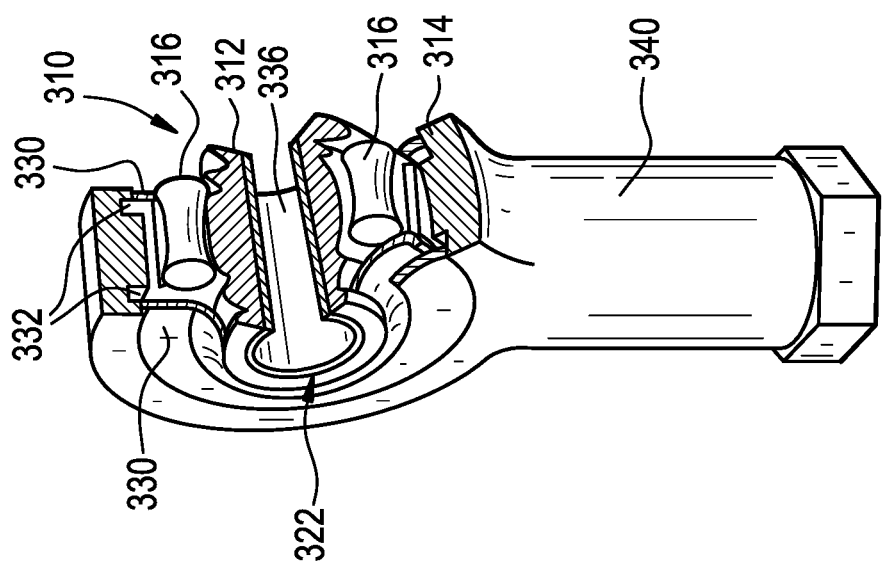
FIG. 7 is a side sectional view of yet another alternate embodiment of a bearing assembly of the present invention.

The present invention is not limited to a bearing assembly comprising two rows of balls, as indicated above. As shown in FIGS. 5-7, the bearing assembly may include rolling elements generally know as rollers of any shape including spherical rollers or balls, convex rollers or barrel rollers, concave rollers or hourglass rollers, cylindrical rollers, tapered rollers, etc. In each type of bearing assembly, the rolling element bearings may have one or two rows of rolling elements.

As shown in FIG. 5, a bearing assembly 110 may comprise an inner race 112 located in an outer race 114 with a plurality of rolling elements or balls 116 located therebetween in a single row. As with the bearing assembly of FIG. 1, the inner race 112 is a ring defined by inner and outer surfaces, the inner surface defining a bore 122 extending therethrough, the bore being located substantially concentrically about an axis F. A lubricious liner 136 is disposed on the inner surface defining the bore 122. In one embodiment, bearing assembly 110 includes a seal 130 positioned across the interface of the inner race 112 and the outer race 114 to inhibit the ingress of debris and contaminants into the bearing assembly. The bearing assembly 110 may include two seals 130 positioned generally opposite one another on opposing sides of the bearing assembly. Retaining rings 132 are employed on the outer race 114 on one side of the seals 130 to secure the seal in place.

As shown in FIG. 6, in one embodiment a bearing assembly 210 includes an inner race 212 located in an outer race 214 with a plurality of rolling elements or barrel rollers 216 (i.e., convex rollers) located therebetween in a single row. As with the bearing assembly of FIG. 1, the inner race 212 is a ring defined by inner and outer surfaces, the inner surface defining a bore 222 extending therethrough, the bore being located substantially concentrically about an axis G. In one embodiment and as shown in FIG. 6, the outer race 214 is integrally formed with a linkage assembly 240, such as for example a flap hinge arm 40 as further described below with reference FIG. 9A. A lubricious liner 236 is disposed on the inner surface defining the bore 222. In one embodiment, bearing assembly 210 includes a seal 230 positioned across the interface of the inner race 212 and the outer race 214 to inhibit the ingress of debris and contaminants into the bearing assembly. The bearing assembly 210 may include two seals 230 positioned generally opposite one another on opposing sides of the bearing assembly. Retaining rings 232 are employed on the outer race 214 on opposing sides of the seals 230 to secure the seals in place.

As shown in FIG. 7, in one embodiment a bearing assembly 310 includes an inner race 312 located in an outer race 314 with a plurality of rolling elements or hourglass rollers 316 (i.e. concave curvature which means the outer raceways correspondingly are convex) located therebetween in a single row. As with the bearing assembly of FIG. 1, the inner race 312 is a ring defined by inner and outer surfaces, the inner surface defining a bore 322 extending therethrough. In one embodiment and as shown in FIG. 7, the outer race 314 is integrally formed with a linkage assembly 340, such as for example flap hinge arm 40 as further described below with reference FIG. 9A. A lubricious liner 336 is disposed on the inner surface defining the bore 322. In one embodiment, bearing assembly 310 includes a seal 330 positioned across the interface of the inner race 312 and the outer race 314 to inhibit the ingress of debris and contaminants into the bearing assembly. The bearing assembly 310 may include two seals 330 positioned generally opposite one another on opposing sides of the bearing assembly. Retaining rings 332 are employed on the outer race 314 to secure the seals in place.

Figure 8:
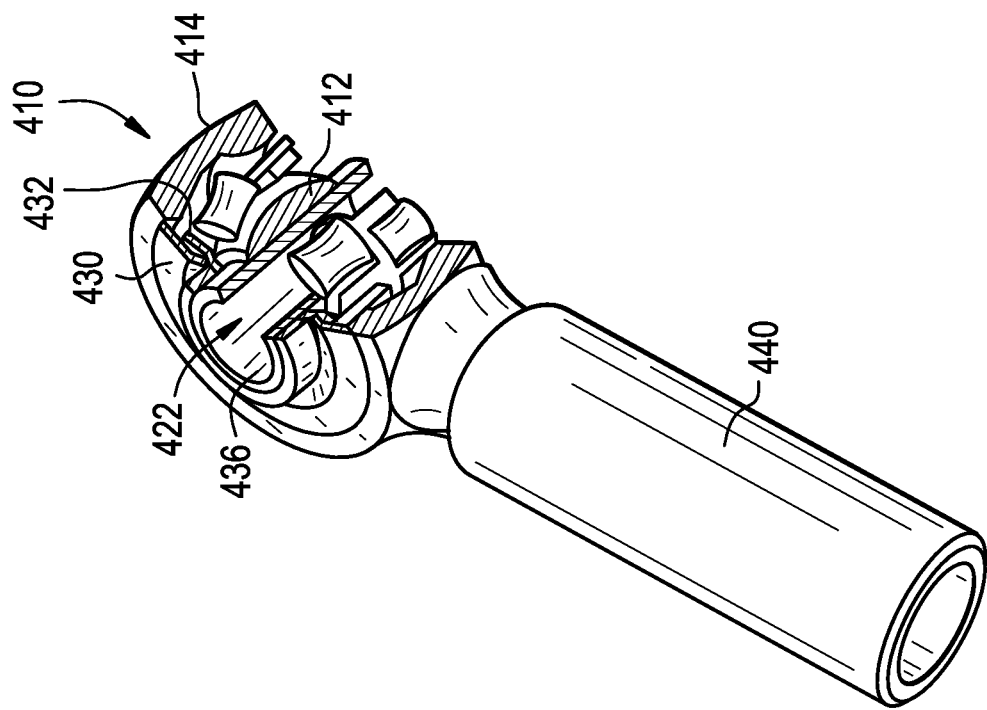
FIG. 8 is a side sectional view of yet another alternate embodiment of a bearing assembly of the present invention.

As shown in FIG. 8, in one embodiment a bearing assembly 410 includes an inner race 412 located in an outer race 414 with a plurality of rolling elements or cylindrical rollers 416 located therebetween in a single row. As with the bearing assembly of FIG. 1, the inner race 412 is a ring defined by inner and outer surfaces, the inner surface defining a bore 422 extending therethrough. In one embodiment and as shown in FIG. 8, the outer race 414 is integrally formed with a linkage assembly 440, such as for example flap hinge arm 40 as further described below with reference FIG. 9A. A lubricious liner 436 is disposed on the inner surface defining the bore 222. In one embodiment, bearing assembly 410 includes a seal 430 positioned across the interface of the inner race 412 and the outer race 414 to inhibit the ingress of debris and contaminants into the bearing assembly. The bearing assembly 210 may include two seals 230 positioned generally opposite one another on opposing sides of the bearing assembly. Retaining rings 432 are employed on the outer race 414 on opposing sides of the seals 430 to secure the seals in place.

As with the lubricious liner 36 described above with reference to the bearing assembly 10, the lubricious liners 136, 236, 336 and/or 436 may be PTFE in fiber form and woven with fabrics, such as, but not limited to, cotton, polyester, glass fiber, carbon fiber, nylon, or aramid materials with or without thermosetting resin or thermoplastic resin. Also, the PTFE fiber may be woven or chopped. Furthermore, the material of the lubricious liners 136, 236, 336 and/or 436 may be molded or injected as desired for the application at hand.

Figure 9A:
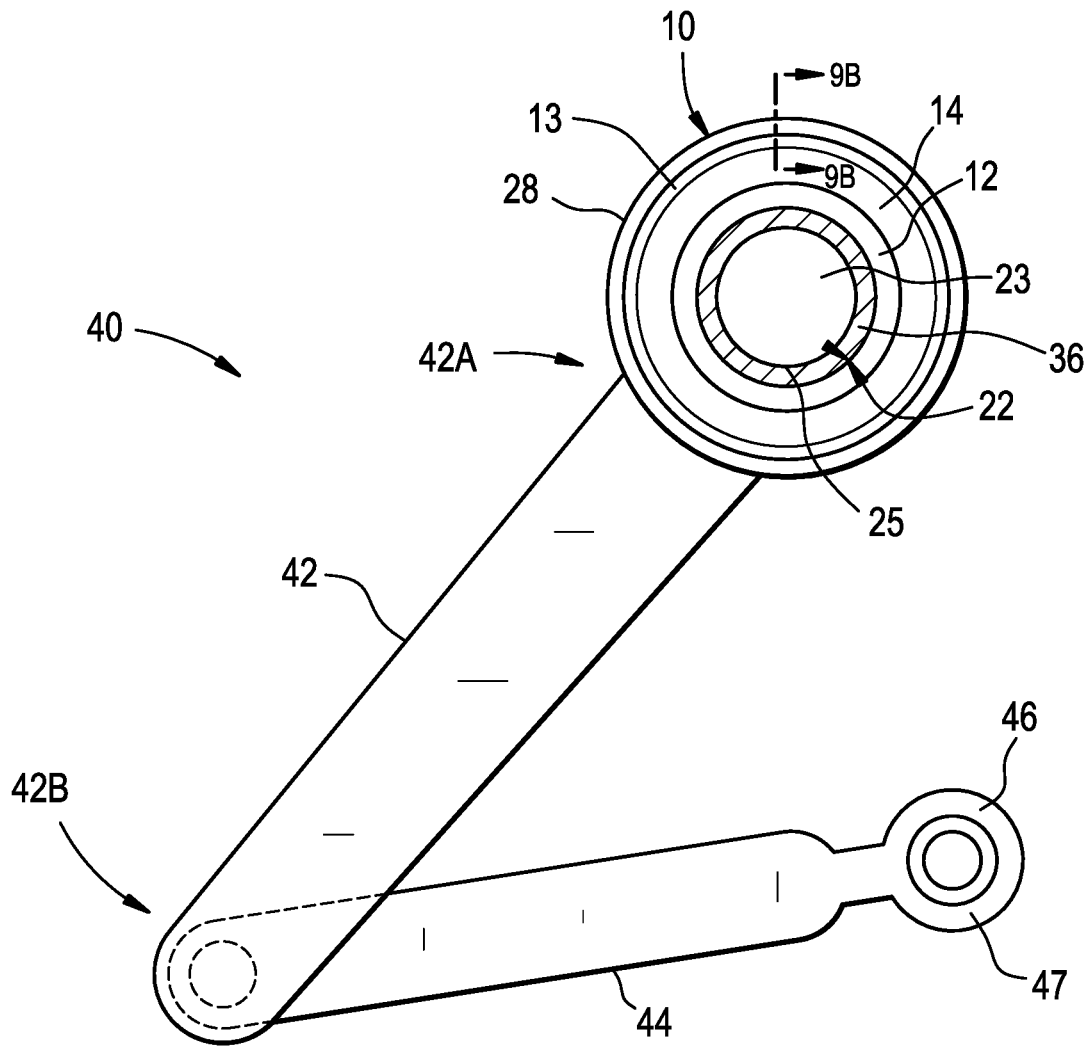
FIG. 9A is a side view of a flap hinge arm of a fixed wing aircraft in which the bearing assembly of FIG. 1
Figure 9B:
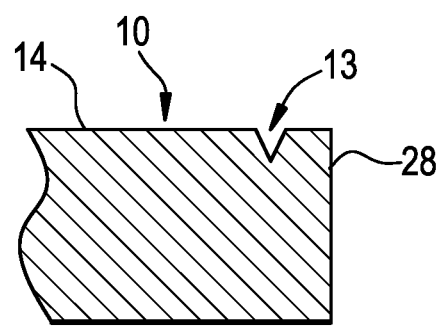
FIG. 9B is a cross sectional view taken along line 9B-9B in FIG. 9A.

As shown in FIG. 9A, one exemplary embodiment of a flap hinge arm for a fixed wing aircraft is designated generally by the reference number 40 and is hereinafter referred to as "flap hinge arm 40." The flap hinge arm 40 is defined by an arm 42 having the bearing assembly 10 mounted on one end 42A thereof and a connecting rod 44 pivotally coupled to an opposing end 42B of the arm. As illustrated, the connecting rod 44 includes a link apparatus 46 having a spherical plain bearing 47 mounted therein. The present invention is not limited to the connecting rod 44 having the link apparatus 46 and the spherical plain bearing 47, however, as any suitable bearing assembly may be associated with the connecting rod. The present invention is also not limited to the bearing assembly 10 being mounted in the flap hinge arm 40, however, as the bearing assembly 110 may also be mounted therein. At the end of a connecting rod, a rod end is typically mounted. This rod end can be attached to the connecting rod by a threaded or welded connection, or any other suitable means. An outer race can be mounted in the rod end eye with a Grumman groove 13, a press fit, or other suitable means. As shown in FIG. 9B, which is a cross sectional view of the Grumman groove 13 in FIG. 9A, taken along line 9B-9B. Instead of an outer race, the inner surface of the rod end eye can be used as the outer raceway (i.e. no separable outer race) by suitable heat treatment and machining (hard turning, grinding, or the like).

Figure 10:
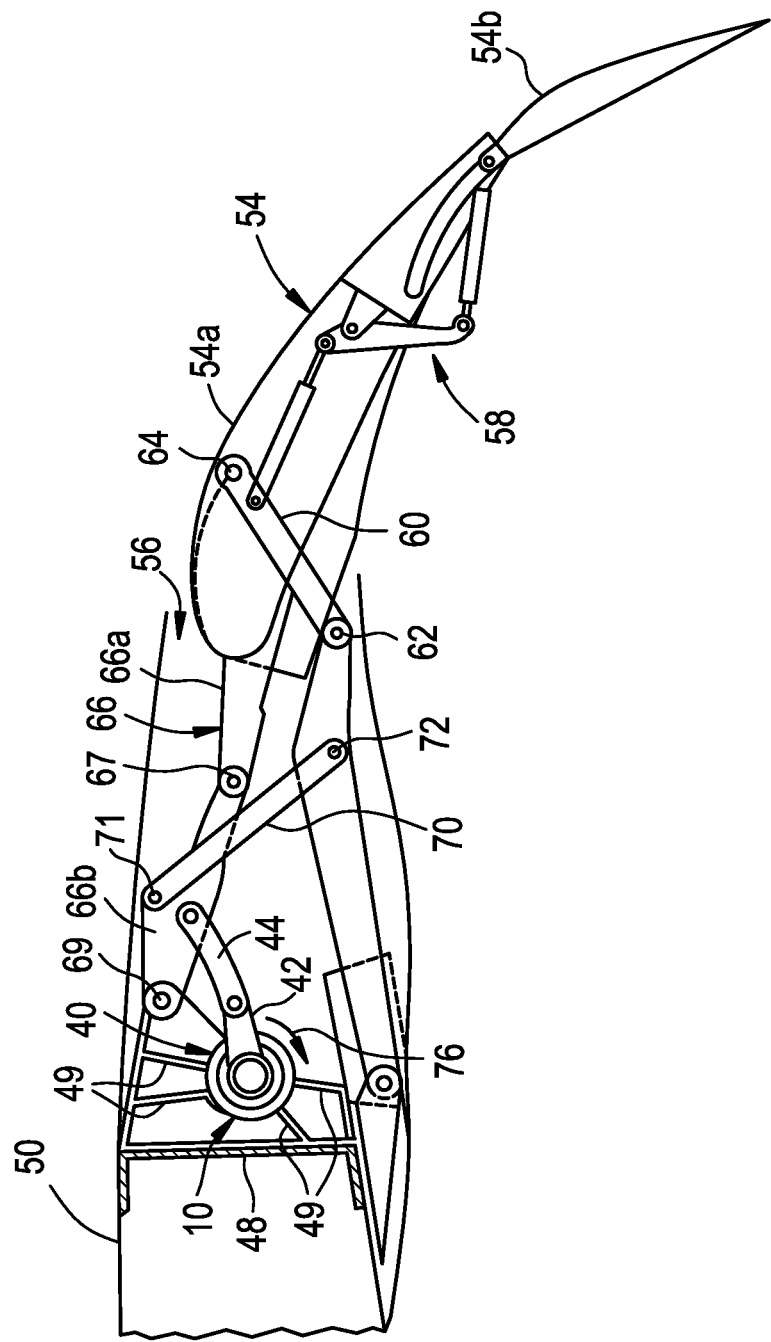
FIG. 10 is a side sectional view of a wing of a fixed wing aircraft incorporating the flap hinge arm of FIG. 9A in an extended position.
Figure 11:
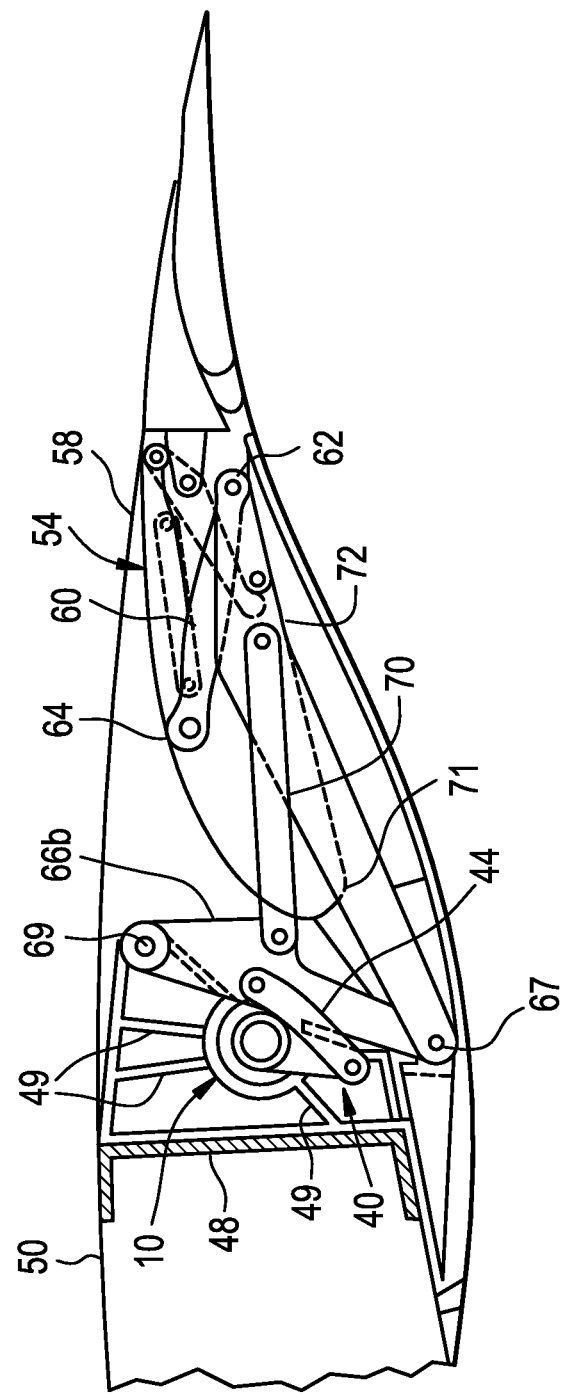
FIG. 11 is a side sectional view of a wing of a fixed wing aircraft incorporating the flap hinge arm of FIG. 9A in a retracted position.

As shown in FIGS. 10 and 11, the flap hinge arm 40 is mounted aft of a spar 48 in a wing 50 of a fixed wing aircraft. The bearing assembly 10 of the flap hinge arm 40 is mounted in ribbing 49 or the like aft of the spar 48. Referring to FIG. 10, the flap hinge arm 40 is in an extended position that allows a flap 54 to which the flap hinge arm is coupled to extend out of an opening 56 at the rearward-facing surface of the wing 50. The flap 54 is defined by a leading portion 54a and a trailing portion 54b linkably coupled to each other via a connecting linkage 58. The connecting linkage 58 is pivotally connected to an extension arm 60 pivotally mounted at a pivot point 62 in the wing 50 and pivotally mounted at a pivot point 64 on the leading portion 54a. The leading portion 54a is coupled to a hinged extension lever 66 comprising a rearward arm 66a coupled to a forward arm 66b at a pivot point 67. The forward arm 66b is pivotally coupled to the wing 50 proximate the ribbing 49 at a pivot point 69. A support link 70 is also coupled to the forward arm 66b at a pivot point 71 and to the wing at a pivot point 72. The connecting rod 44 of the flap hinge arm 40 is also pivotally connected to the forward arm 66b.

Referring now to FIG. 11, when the flap hinge arm 40 is retracted (the arm 42 is moved in the direction as indicated by arrow 76 in FIG. 10), the hinged extension lever 66 is pivoted at pivot point 69 and pulled forward, thereby causing the forward arm 66b and the rearward arm 66a to fold at pivot point 67. In doing so, the flap 54 is pulled into the opening 56 in the rearward-facing surface of the wing 50.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

What is claimed is:

1. A flap hinge arm (40) of a fixed wing aircraft, comprising:
   an arm (42);
   a connecting rod (44) pivotally connected to the arm (42) and pivotally connectable to a flap (54); and
   a bearing assembly (10, 110, 210, 310, 410) positioned on the arm and connectable to a wing of the fixed wing aircraft, the bearing assembly comprising:
      a bearing comprising:
         an outer race (14, 114, 214, 314, 414) having an inner surface (26) defining a concave contour;
         an inner race (12, 112, 212, 312, 412) positioned in the outer race (14, 114, 214, 314, 414), the inner race (12, 112, 212, 312, 412) having an inner surface (18) defining an inner race bore (22) therethrough and an outer surface (20) defining at least one groove (17) circumscribing the outer surface (20);
         a plurality of rolling elements (16, 116, 216, 316, 416) rollably located in the at least one groove and in rolling contact with the inner surface (26) of the outer race (14, 114, 214, 314, 414); and
         a lubricious liner (36, 136, 236, 336, 436) having an inner liner-surface (36B) and an exterior liner-surface (36A), the inner liner-surface (36B) defining a liner bore engaging an exterior surface (25) of a shaft (23) extending through the liner bore such that during normal operation of the bearing assembly, the shaft is fixed relative to the inner race, the exterior liner-surface (36A) adhered to the inner surface (18), the lubricious liner (36, 136, 236, 336, 436) is an angular misalignment feature disposed between the shaft (23) and the inner race (12, 112, 212, 312, 412) and a torque dependent rotational fail-safe mechanism, the shaft being press fit into the liner bore;
      wherein the angular misalignment feature is configured to accommodate angular misalignment between the shaft (23) and the inner race (12, 112, 212, 312, 412); and
      wherein during normal operation the bearing assembly is configured to accommodate rotation of the outer race (14, 114, 214, 314, 414) relative to the inner race (14, 114, 214, 314, 414) and to rotationally fix the inner race (12, 112, 212, 312, 412) relative to the shaft (23) when a torque exerted on the outer race (14, 114, 214, 314, 414) is a first torque magnitude t1,
      wherein during anomalous operation or when the bearing seizes, the torque exerted on the outer race (14, 114, 214, 314, 414) is of a second torque magnitude that is selected from the group consisting of 1.1, 1.25, and 1.5 times the first torque magnitude t1 and the torque dependent rotational fail-safe mechanism is configured to accommodate rotation of the inner race (12, 112, 212, 312, 412) relative to the shaft (23), wherein the lubricious liner (36, 136, 236, 336, 436) has an axial length (L) and a continuous annular shape, the lubricious liner (36, 136, 236, 336, 436) comprising a thermoplastic resin or a thermosetting resin, the thermosetting resin selected from the group consisting of a phenolic resin, a polyester resin, an epoxy resin, a urethane resin, a polyurethane resin, and a polyimide resin, wherein the thermoplastic resin or the thermosetting resin comprises PTFE fibers and a fabric selected from the non-metallic material group consisting of cotton, polyester, glass fiber, carbon fiber, nylon, aramid material, and combinations of the foregoing materials, and the lubricious liner (36, 136, 236, 336, 436) engaging the exterior surface (25) of the shaft (23) continuously and entirely circumferentially along the axial length (L) of the lubricious liner (36, 136, 236, 336, 436), and the exterior liner-surface (36A) adhered to the inner surface (18) continuously and entirely circumferentially along the axial length (L) of the lubricious liner (36, 136, 236, 336, 436).

2. The flap hinge arm (40) of a fixed wing aircraft of claim 1, further comprising:
a seal secured to the outer race and engaging a surface of the inner race; and
a retaining ring positioned on a side of the seal to secure the seal in place.

3. The flap hinge arm (40) of a fixed wing aircraft of claim 1, wherein the plurality of rolling elements (16, 116, 216, 316, 416) are made from a material selected from the group consisting of stainless steel and corrosion resistant nitrided steel.

4. The flap hinge arm (40) of a fixed wing aircraft of claim 1, wherein the outer race (14, 114, 214, 314, 414) and the inner race (12, 112, 212, 312, 412) are made from a material selected from the group consisting of stainless steel and corrosion resistant nitrided steel.

5. The flap hinge arm (40) of a fixed wing aircraft of claim 1, wherein the plurality of rolling elements (16, 116, 216, 316, 416) is selected from a group consisting of spherical rollers, convex rollers, concave rollers and cylindrical rollers.

6. The flap hinge arm (40) according to claim 1, wherein the arm comprises a rod end, wherein the outer race (14, 114, 214, 314, 414) is mounted in an eye of the rod end with a Grumman groove or is press fit.

7. A flap hinge arm (40) of a fixed wing aircraft, comprising:
an arm (42);
a connecting rod (44) pivotally connected to the arm (42) and pivotally connectable to a flap (54); and
a bearing assembly (10, 110, 210, 310, 410) positioned on the arm and connectable to a wing of the fixed wing aircraft, the bearing assembly comprising:
a bearing comprising:
an outer race (14, 114, 214, 314, 414) having an inner surface (26) defining a concave contour;
an inner race (12, 112, 212, 312, 412) positioned in the outer race (14, 114, 214, 314, 414), the inner race (12, 112, 212, 312, 412) having an inner surface (18) defining an inner race bore (22) therethrough and an outer surface (20) defining at least one groove (17) circumscribing the outer surface (20);
a plurality of rolling elements (16, 116, 216, 316, 416) rollably located in the at least one groove and in rolling contact with the inner surface (26) of the outer race (14,114, 214, 314, 414); and
a lubricious liner (36, 136, 236, 336, 436) extending from a first end (36C) to an opposing second end (36D) and having an inner liner-surface (36B) and an exterior liner-surface (36A), the inner liner-surface (36B) defining a liner bore engaging an exterior surface (25) of a shaft (23) extending through the liner bore such that during normal operation of the bearing assembly the shaft is fixed relative to the inner race, the exterior liner-surface (36A) adhered to the inner surface (18), the lubricious liner (36, 136, 236, 336, 436) is an angular misalignment feature disposed between the shaft (23) and the inner race (12, 112, 212, 312, 412) and a torque dependent rotational fail-safe mechanism, the shaft being press fit into the liner bore;
wherein the angular misalignment feature is configured to accommodate angular misalignment between the shaft (23) and the inner race (12, 112, 212, 312, 412) upon application of a force perpendicular to the central axis (C) of the shaft (23), wherein upon application of the force, the central axis (C) of the shaft (23) is misaligned by a misalignment angle (a), the misalignment angle is from about 1 degree to about 15 degrees, the lubricious liner having a modulus of compression of a magnitude to allow misalignment through compression and expansion between an initial width, a compressed width and an expanded width, wherein compression of the first end (36C) or the second end (36D) of the lubricious liner (36, 136, 236, 336, 436) by at least a portion of the shaft (23) from the initial width to the compressed width corresponds to expansion at the respective first end (36C) or the second end (36D) of the lubricious liner (36, 136, 236, 336, 436) from the initial width to the expanded width, wherein the initial width of the lubricious liner is compressible to the compressed width and expandable to the expanded width by about 10% of the initial width, by about 25% of the initial width, or about 50% of the initial width;
wherein during normal operation the bearing assembly is configured to accommodate rotation of the outer race (14, 114, 214, 314, 414) relative to the inner race (14, 114, 214, 314, 414) and to rotationally fix the inner race (12, 112, 212, 312, 412) relative to the shaft (23) when a torque exerted on the outer race (14, 114, 214, 314, 414) is a first torque magnitude t1, wherein during anomalous operation or when the bearing seizes, the torque exerted on the outer race (14, 114, 214, 314, 414) is of a second torque magnitude that exceeds the first torque magnitude t1 and the torque dependent rotational fail-safe mechanism is configured to accommodate rotation of the inner race (12, 112, 212, 312, 412) relative to the shaft (23).

8. The flap hinge arm (40) according to claim 7, wherein the arm comprises a rod end, wherein the outer race (14, 114, 214, 314, 414) is mounted in an eye of the rod end with a Grumman groove or is press fit.

* * * * *